US011522209B2

(12) United States Patent
Ikeuchi et al.

(10) Patent No.: US 11,522,209 B2
(45) Date of Patent: Dec. 6, 2022

(54) CONTAINER-TYPE BATTERY

(71) Applicant: Sumitomo Electric Industries, Ltd., Osaka (JP)

(72) Inventors: Atsuo Ikeuchi, Osaka (JP); Takeshi Yamana, Osaka (JP); Kenji Motoi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/093,686

(22) PCT Filed: Apr. 21, 2016

(86) PCT No.: PCT/JP2016/062653
§ 371 (c)(1),
(2) Date: Oct. 15, 2018

(87) PCT Pub. No.: WO2017/183158
PCT Pub. Date: Oct. 26, 2017

(65) Prior Publication Data
US 2019/0140301 A1 May 9, 2019

(51) Int. Cl.
*H01M 8/18* (2006.01)
*H01M 8/04186* (2016.01)
*H01M 8/04276* (2016.01)

(52) U.S. Cl.
CPC ....... *H01M 8/188* (2013.01); *H01M 8/04186* (2013.01); *H01M 8/04276* (2013.01); *H01M 8/18* (2013.01); *Y02E 60/50* (2013.01)

(58) Field of Classification Search
CPC ............. H01M 8/188; H01M 8/04276; H01M 8/04186; Y02E 60/50
See application file for complete search history.

(56) References Cited

U.S. PATENT DOCUMENTS

2004/0029019 A1* 2/2004 Clarke .................... H01M 4/96
429/347
2010/0092813 A1 4/2010 Sahu
(Continued)

FOREIGN PATENT DOCUMENTS

CN 102403519 A 4/2012
CN 203179966 U 9/2013
(Continued)

*Primary Examiner* — Osei K Amponsah
(74) *Attorney, Agent, or Firm* — Baker Botts L.L.P.; Michael A. Sartori (57) ABSTRACT

A battery according to an embodiment of the present invention includes: a plurality of tanks (2) storing electrolyte containing ions of which valence is changed; a cell (1) configured to cause oxidation-reduction of the electrolyte so as to be charged or discharged; a pipe (3) connecting the plurality of tanks and the cell; and a pump (4) configured to circulate the electrolyte between the plurality of tanks and the cell through the pipe. The battery according to an embodiment of the present invention includes a container (5) housing the plurality of tanks (2), the cell (1), the pipe (3), and the pump (4). The container has a bottom (51), a side (52), and a top (53). Accordingly, the battery in an embodiment of the present invention can be installed easily and its installation area can be reduced.

12 Claims, 9 Drawing Sheets

(56) References Cited

U.S. PATENT DOCUMENTS

| | | | |
|---|---|---|---|
| 2012/0021303 A1* | 1/2012 | Amendola | H01M 4/42 |
| | | | 429/406 |
| 2013/0011704 A1 | 1/2013 | Horne et al. | |
| 2013/0115538 A1 | 5/2013 | Yasuda et al. | |
| 2013/0302710 A1* | 11/2013 | Boersma | H01M 8/04228 |
| | | | 429/429 |
| 2014/0106196 A1 | 4/2014 | Ahn et al. | |
| 2016/0006051 A1* | 1/2016 | Winter | H01M 8/04201 |
| | | | 429/418 |
| 2016/0141698 A1* | 5/2016 | Huang | H01M 8/188 |
| | | | 429/108 |
| 2017/0054173 A1 | 2/2017 | Ikeuchi | |
| 2017/0309981 A1* | 10/2017 | Miller | H01M 10/4214 |
| 2018/0166725 A1* | 6/2018 | Sun | H01M 8/188 |

FOREIGN PATENT DOCUMENTS

| | | |
|---|---|---|
| CN | 203932163 U | 11/2014 |
| JP | 54-097737 A | 8/1979 |
| JP | 60-167283 A | 8/1985 |
| JP | H09-103997 A | 4/1997 |
| JP | 2001-202938 A | 7/2001 |
| JP | 2002-015762 A | 1/2002 |
| JP | 2005-243326 A | 9/2005 |
| JP | 2009-179354 A | 8/2009 |
| JP | 2011-228180 A | 11/2011 |
| JP | 2011-228181 A | 11/2011 |
| JP | 2013-037814 A | 2/2013 |
| JP | 2014-505976 A | 3/2014 |
| JP | 2015-520484 A | 7/2015 |
| JP | 2015-156325 A | 8/2015 |
| JP | 2015-219991 A | 12/2015 |
| KR | 10-2012-0128655 A | 11/2012 |
| KR | 10-2013-0013055 A | 2/2013 |
| WO | 2010/042895 A1 | 4/2010 |
| WO | 2012/094674 A2 | 7/2012 |
| WO | 2013/169950 A1 | 11/2013 |
| WO | 2014/207923 A1 | 12/2014 |
| WO | 2015/029941 A1 | 3/2015 |

\* cited by examiner

CONTAINER-TYPE BATTERY

TECHNICAL FIELD

The present invention relates to container-type batteries, and particularly relates to a container-type redox flow battery.

BACKGROUND ART

The redox flow battery has been known widely. The redox flow battery is a rechargeable battery discharged and charged by valence change of ions in electrolyte. The conventional redox flow battery is of plant type.

In the plant-type redox flow battery, tanks storing electrolyte and a cell in which oxidation-reduction of ions in electrolyte is caused so as to be charged or discharged are arranged separately from each other (PTL 1, for example).

CITATION LIST

Patent Literature

PTL 1: Japanese Patent Laying-Open No. 2013-37814

SUMMARY OF INVENTION

Problem to be Solved by the Invention

The plant-type redox flow battery requires assembly of the tanks and the cell for example at the site where the battery is to be installed. Construction work for example for installation of the plant-type redox flow battery is therefore complicated. Further, because the tanks and the cell for example of the plant-type redox flow battery are arranged separately from each other, the installation area occupied by the installed battery is large.

The present invention has been made in view of these problems of the conventional art. More specifically, an object of the invention is to provide a battery that can be installed easily and its installation area can be reduced.

Solution to Problem

A battery according to an embodiment of the present invention includes: a plurality of tanks storing electrolyte containing ions of which valence is changed; a cell configured to cause oxidation-reduction of the electrolyte so as to be charged or discharged; a pipe connecting the plurality of tanks and the cell; and a pump configured to circulate the electrolyte between the plurality of tanks and the cell through the pipe. The battery according to an embodiment of the present invention includes a container housing the plurality of tanks, the cell, the pipe, and the pump. The container has a bottom, a side, and a top.

Advantageous Effects of the Invention

According to the foregoing, the battery according to an aspect of the present invention can be installed easily and its installation area can be reduced.

DESCRIPTION OF EMBODIMENTS

Initially, features of an embodiment of the present invention are described one by one.

(1) A battery according to an embodiment of the present invention includes: a plurality of tanks storing electrolyte containing ions of which valence is changed; a cell configured to cause oxidation-reduction of the electrolyte so as to be charged or discharged; a pipe connecting the plurality of tanks and the cell; and a pump configured to circulate the electrolyte between the plurality of tanks and the cell through the pipe. The battery according to an embodiment of the present invention includes a container housing the plurality of tanks, the cell, the pipe, and the pump. The container has a bottom, a side, and a top.

The above features enable easy installation and reduction of the installation area.

(2) As to (1), the container may have a widthwise direction and a longitudinal direction, and the plurality of tanks may be arranged in the widthwise direction.

The above features enable reduction of the dead space in the whole space in the container. In other words, the above features enable further downsizing of the container or further increase of the tank capacity.

(3) The battery of (2) may include a cooler configured to cool the electrolyte, and the plurality of tanks may be arranged between the cooler and the cell in the longitudinal direction.

The above features enable maintenance of the pipe to be facilitated.

(4) The battery of (2) may include a cooler configured to cool the electrolyte, and the cooler may be disposed between the plurality of tanks and the cell in the longitudinal direction.

The above features enable maintenance of the cell and the cooler to be facilitated.

(5) The battery of (2) may include a cooler configured to cool the electrolyte, and the cell may be disposed between the plurality of tanks and the cooler in the longitudinal direction.

The above features enable maintenance of the pipe to be facilitated.

(6) The battery of (1) to (5) may include a valve including a valve inlet and a valve outlet and configured to prevent gas from flowing from the valve outlet to the valve inlet, and the valve inlet may communicate with an inside of at least one of the plurality of tanks.

The above features enable increase of the internal pressure of the tank, due to temperature increase for example, to be suppressed.

(7) As to (6), the valve outlet of the valve may communicate with an outside of the container.

The above features enable prevention of breakage of the tank, and prevention of filling of the container inside with gas discharged from the inside of the tank through the valve.

(8) As to (6), the container may have a hole allowing the inside and an outside of the container to communicate with each other, and the battery may include a ventilator configured to generate an airflow from the inside of the container toward the outside of the container through the hole.

The above features enable prevention of breakage of the tank, and prevention of filling of the container inside with gas discharged from the inside of the tank through the valve.

(9) The battery of (1) to (8) may further include an additional pipe branching from the pipe and connectable to an additional tank disposed outside the container.

The above features allow a plurality of battery cells to be coupled to each other. In other words, the above features enable increase of electric power that can be generated from the battery.

(10) The battery of (1) to (9) may further include an additional pipe branching from the pipe and connectable to an additional cell disposed outside the container.

The above features allow a plurality of battery tanks to be coupled to each other. In other words, the above features enable increase of the capacity for electric power that can be stored in the battery.

(11) As to (1) to (10), the container may include a lid formed by the side and the top, and the lid may be separable from the bottom.

The above features enable maintenance to be done at the installation site.

(12) As to (1) to (11), the container may include a guide member extending in a height direction which is the direction from the bottom to the top.

The above features enable prevention of breakage of the cell for example due to contact between the lid and the cell for example inside the container while the lid is removed from the container.

(13) As to (1) to (12), the plurality of tanks may be spaced from at least one of the side and the top.

The above features enable improvement of air permeability in container.

(14) As to (1) to (13), at least one of a portion of the container located on the side and corresponding to the cell and a portion of the container located on the side and corresponding to the pump may be openable and closable.

The above features facilitate maintenance of the cell and the pump.

In the following, embodiments of the present invention are detailed with reference to the drawings. In the drawings, the same or corresponding parts are denoted by the same reference characters. The following embodiments may optionally be combined at least partially.

First Embodiment

In the following, an overview of a configuration of a battery in a first embodiment is described.

Figure 1:
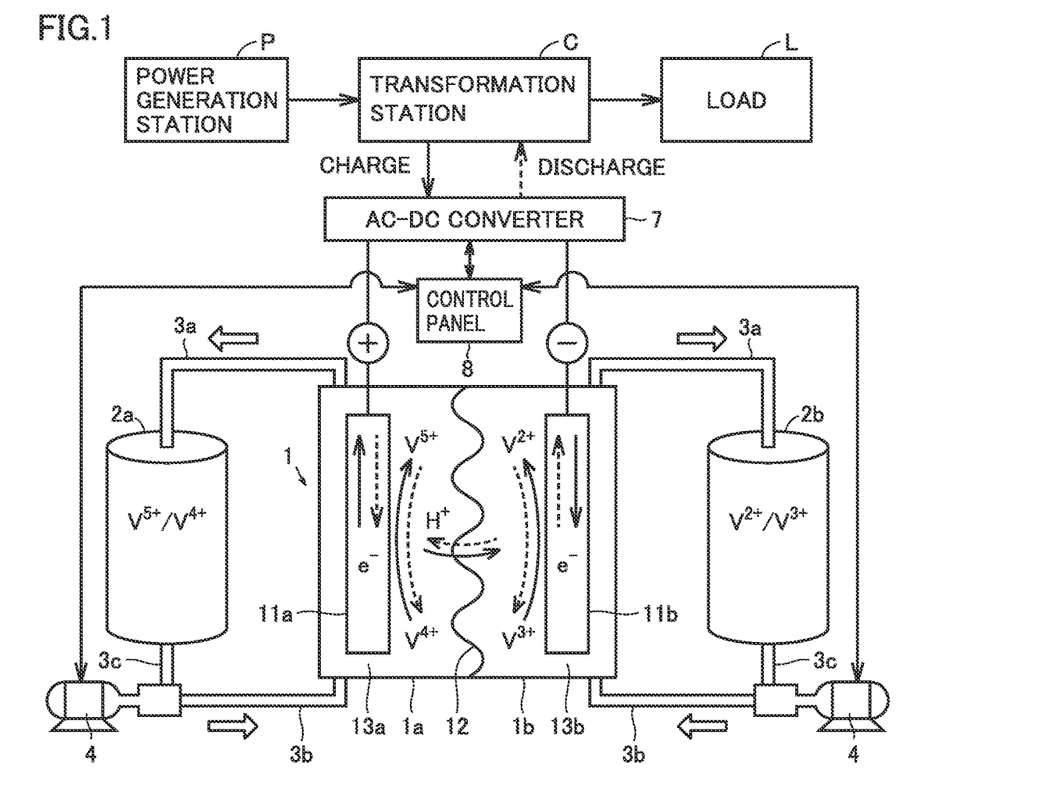
FIG. 1 is a schematic diagram of a battery according to a first embodiment.

FIG. 1 is a schematic diagram showing the configuration of the battery in the first embodiment. As shown in FIG. 1, the battery in the first embodiment includes a cell 1, a tank 2, a pipe 3, a pump 4, and a container 5 (see FIG. 2). The battery in the first embodiment may further include a cooler 6 (see FIG. 3). To the battery in the first embodiment, an AC-DC converter 7 and a control panel 8 are connected.

Cell 1 includes an electrode 11. Electrode 11 includes a positive electrode 11a and a negative electrode 11b. For positive electrode 11a and negative electrode 11b, carbon felt is used, for example.

Cell 1 also includes a membrane 12. Membrane 12 divides cell 1 into a positive electrode 11a side and a negative electrode 11b side. Membrane 12 is an ion-permeable membrane that does not pass metal ions of which valence is changed, but passes ions acting to keep the electrical neutrality of the electrolyte.

Electrolyte 13 is stored in cell 1. Electrolyte 13 includes a positive electrode electrolyte 13a and a negative electrode electrolyte 13b. Positive electrode electrolyte 13a circulates in the positive electrode 11a side of cell 1. Negative electrode electrolyte 13b circulates in the negative electrode 11b side of cell 1.

Electrolyte 13 contains metal ions of which valence is changed. Metal ions of which valence is changed that are contained in positive electrode electrolyte 13a are tetravalent vanadium ions ($V^{4+}$) for example. Metal ions of which valence changed that are contained in negative electrode electrolyte 13b are trivalent vanadium ions ($V^{3+}$) for example.

Electrolyte 13 contains ions acting to keep the electrical neutrality of the electrolyte. Ions acting to keep the electrical neutrality of electrolyte 13 are hydrogen ions ($H^+$) for example.

Tank 2 includes a plurality of tanks. For example, tank 2 includes a positive electrode tank 2a and a negative electrode tank 2b. Positive electrode tank 2a stores positive electrode electrolyte 13a. Negative electrode tank 2b stores negative electrode electrolyte 13b. Preferably, positive electrode tank 2a and negative electrode tank 2b are corrosion resistant against electrolyte 13. For example, polyethylene, rubber, or the like is used for positive electrode tank 2a and negative electrode tank 2b.

Pipe 3 includes a first pipe 3a, a second pipe 3b, and a third pipe 3c. First pipe 3a couples cell 1 to tank 2a. Second pipe 3b couples cell 1 to pump 4. Third pipe 3c couples tank 2 to pump 4. Preferably, pipe 3 is corrosion resistant against electrolyte. For example, polyethylene or the like is used for pipe 3.

Pump 4 circulates electrolyte 13 between cell 1 and tank 2 through pipe 3. Pump 4 causes electrolyte 13 to circulate through cell 1, first pipe 3a, tank 2, third pipe 3c, and second pipe 3b in this order, for example. A circulation pump, for example, is used as pump 4.

Cooler 6 is provided for cooling the electrolyte. Cooler 6 is mounted on second pipe 3b. The location where cooler 6 is disposed is not limited to this. Cooler 6 may alternatively be mounted on first pipe 3a or third pipe 3c, for example. Cooler 6 is a water-cooling or air-cooling type heat exchanger.

Figure 2:
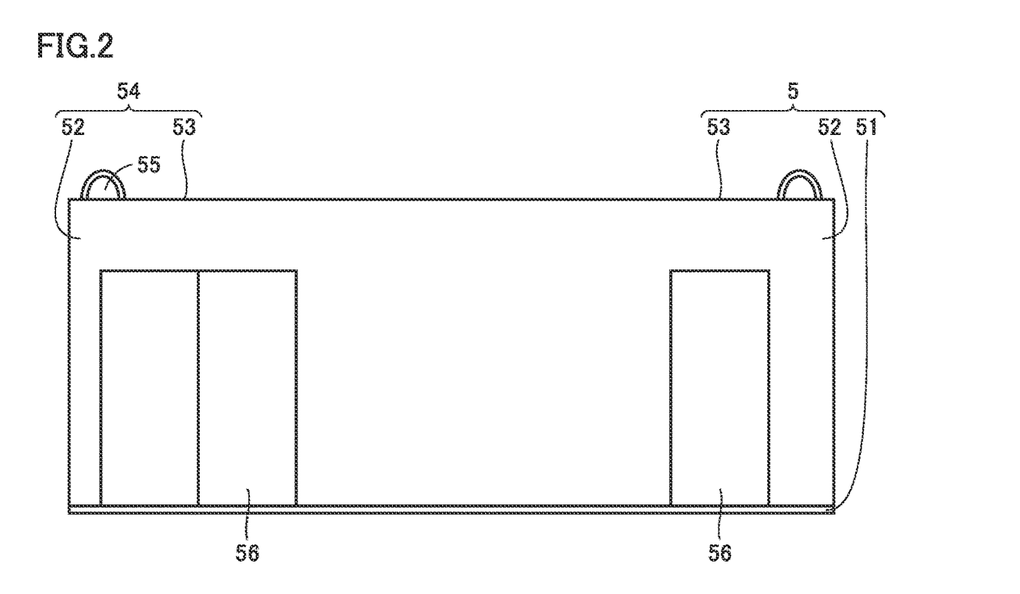
FIG. 2 is an external view of the battery according to the first embodiment.

FIG. 2 is an external view of the battery in the first embodiment. As shown in FIG. 2, container 5 has a bottom 51, a side 52, and a top 53. Details of the structure of container 5 are described later herein.

Cell 1, tank 2, pipe 3, pump 4, and cooler 6 are housed in container 5. Cell 1, tank 2, pipe 3, pump 4, and cooler 6 are arranged on bottom 51. Details of the arrangement of cell 1, tank 2, pipe 3, pump 4, and cooler 6 on bottom 51 are described later herein.

Preferably, AC-DC converter 7 and control panel 8 are disposed outside container 5. AC-DC converter 7 converts AC from a power generation station P into DC and supplies DC to the cell. AC-DC converter 7 converts DC from cell 1 into AC and supplies AC to a load L. Control panel 8 controls pump 4 and AC-DC converter 7 for example.

In the following, an internal arrangement of the battery in the first embodiment is described.

Figure 3:
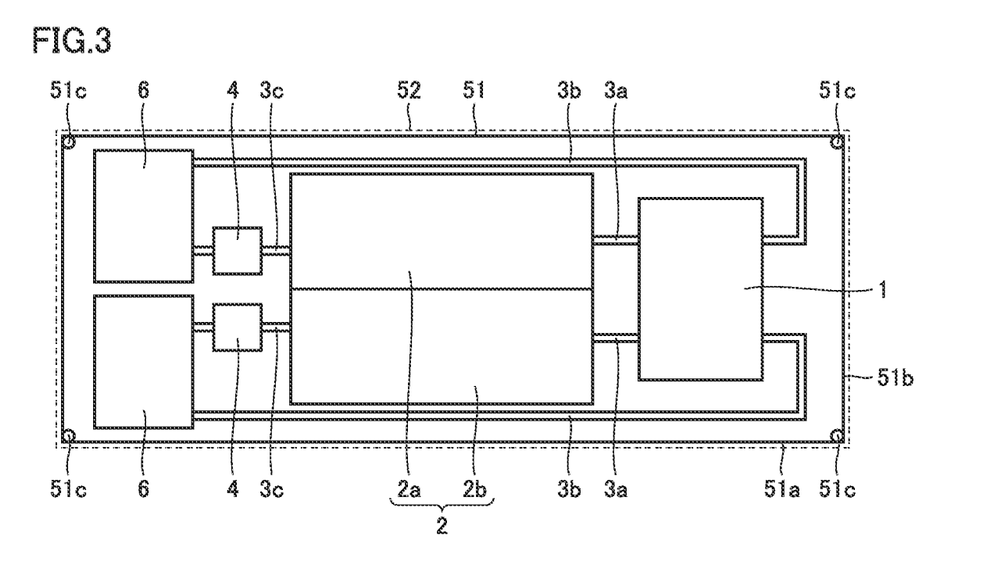
FIG. 3 is a top view of an internal structure of the battery according to the first embodiment.

FIG. 3 is a top view showing the internal arrangement of the battery in the first embodiment. As shown in FIG. 3, bottom 51 has a longer side 51a and a shorter side 51b. In the following, the direction parallel to longer side 51a is referred to as longitudinal direction, the direction parallel to shorter side 51b is referred to as widthwise direction, and the direction perpendicular to longer side 51a and shorter side 51b is referred to as height direction.

Cell 1, tank 2, pipe 3, and pump 4, and cooler 6 are arranged on bottom 51. Preferably, positive electrode tank 2a and negative electrode tank 2b are arranged in the widthwise direction. Preferably, tank 2 is disposed to be spaced from at least one of side 52 and top 53.

Preferably, tank 2 is disposed between cell 1 and cooler 6 in the longitudinal direction. Pump 4 is disposed in a peripheral region of cooler 6. In this case, second pipe 3b extends between tank 2 and side 52.

Figure 4:
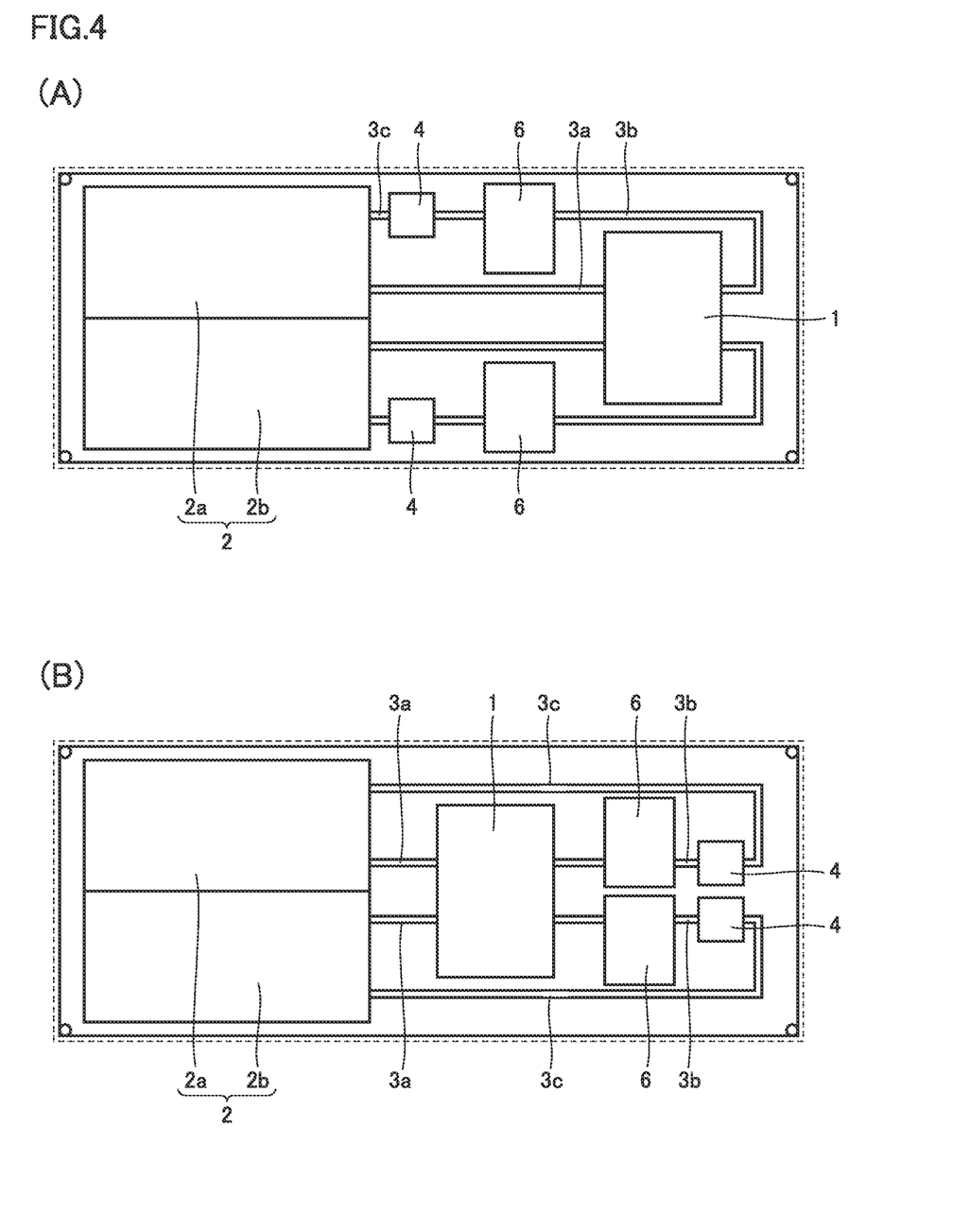
FIG. 4 is a top view of an internal structure of a battery according to a modification of the first embodiment.

The arrangement of cell 1, tank 2, pump 4, and cooler 6 is not limited to the above-described one. FIG. 4 is a top view showing an internal structure of a battery according to a modification of the first embodiment. As shown in FIG. 4 (A), cooler 6 and pump 4 may be arranged between cell 1 and tank 2 in the longitudinal direction. Alternatively, as shown in FIG. 4 (B), cell 1 may be arranged between tank 2 and cooler 6 in the longitudinal direction.

Figure 5:
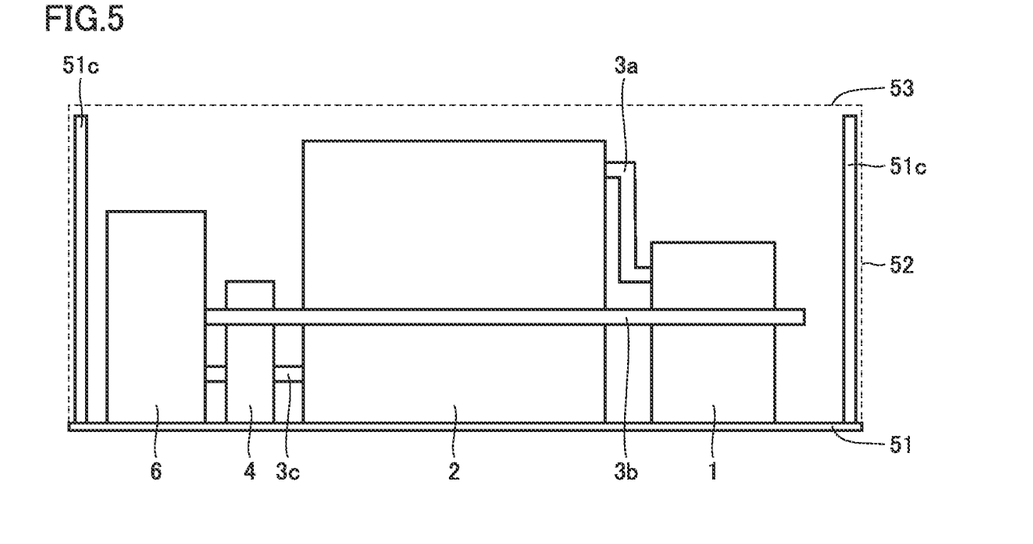
FIG. 5 is a side view of the internal structure of the battery according to the first embodiment.

FIG. 5 is a side view of an internal structure of the battery in the first embodiment. As shown in FIG. 5, a guide member 51c may be mounted on bottom 51. Guide member 51c is disposed to extend from bottom 51 in the height direction. Guide member 51c is disposed at each of four corners of bottom 51.

In the following, a structure of container 5 for the battery in the first embodiment is described.

As described above, container 5 has bottom 51, side 52, and top 53. Side 52 and top 53 form a lid 54. Lid 54 is coupled to bottom 51.

Lid 54 and bottom 51 may be separable from each other. Lid 54 may be equipped with a lifting ring 55. Preferably, lifting ring 55 is disposed in the vicinity of each of four corners of top 53. In this case, a wire may be inserted through lifting ring 55 and pulled up with a crane or the like to separate lid 54 from bottom 51.

Side 52 may be equipped with a door 56. On door 56, side 52 is openable and closable. Preferably, door 56 is disposed at a position corresponding to at least one of cell 1, pump 4, and cooler 6 in container 5.

In the following, operations of the battery in the first embodiment are described.

First, a charging operation is described. Positive potential is supplied from power generation station P to positive electrode 11a through a transformation station C and AC-DC converter 7. Accordingly, tetravalent vanadium ions contained in positive electrode electrolyte 13a are subjected to an oxidation reaction at positive electrode 11a. Namely, tetravalent vanadium ions contained in positive electrode electrolyte 13a are changed into pentavalent vanadium ions.

Pump 4 is activated to cause positive electrode electrolyte 13a containing a high content of tetravalent vanadium ions to be supplied from positive electrode tank 2a to positive electrode 11a of cell 1 through pipe 3. Then, a similar oxidation reaction is repeated. Accordingly, the ratio of pentavalent vanadium ions contained in positive electrode electrolyte 13a is increased.

Negative potential is supplied from power generation station P to negative electrode 11b through AC-DC converter 7. The negative potential causes trivalent vanadium ions contained in negative electrode electrolyte 13b to be subjected to a reduction reaction at negative electrode 11b. Namely, trivalent vanadium ions contained in negative electrode electrolyte 13b are changed into divalent vanadium ions.

Pump 4 is activated to cause negative electrode electrolyte 13b containing a high content of trivalent vanadium ions to be supplied from negative electrode tank 2b to negative electrode 11b of cell 1 through pipe 3. Then, a similar reduction reaction is repeated. Accordingly, the ratio of divalent vanadium ions contained in negative electrode electrolyte 13b is increased.

As such oxidation-reduction reactions occur, hydrogen ions in positive electrode electrolyte 13a move in cell 1 from the positive electrode 11a side to the negative electrode 11b side through membrane 12. Thus, the electrical neutrality of the electrolyte is maintained. In this way, electric energy is stored in electrolyte 13.

Next, a discharging operation is described. In the positive electrode 11a side of cell 1, pentavalent vanadium ions contained in positive electrode electrolyte 13a are changed back to tetravalent vanadium ions through reduction. On the other hand, in the negative electrode 11b side of cell 1, divalent vanadium ions contained in negative electrode electrolyte 13b are changed back to trivalent vanadium ions through oxidation. Such oxidation-reduction reactions cause hydrogen ions contained in negative electrode electrolyte 13b to move in cell 1 from the negative electrode 11b side to the positive electrode 11a side through membrane 12. Accordingly, electromotive force is generated between positive electrode 11a and negative electrode 11b. This electromotive force causes electric power to be supplied to load L through transformation station C and AC-DC converter 7.

Pump 4 is activated to cause positive electrode electrolyte 13a containing a high content of pentavalent vanadium ions and negative electrode electrolyte 13b containing a high content of divalent vanadium ions to be supplied from tank 2 to cell 1 through pipe 3. Then, a similar reaction is repeated. Accordingly, electric power is kept supplied to load L.

The oxidation-reduction reactions as described above cause temperature increase of the electrolyte. Such a temperature increase of the electrolyte is suppressed by cooling electrolyte 13 by means of cooler 6.

In the following, advantageous effects of the battery in the first embodiment are described.

The conventional redox flow battery has tanks and a cell for example that are arranged separately from one another. For the conventional redox flow battery, therefore, the tanks and cell for example must be assembled at the site where the battery is to be installed. In other words, the installation work for the conventional redox flow battery is complicated.

In contrast, as to the battery in the first embodiment, cell 1, tank 2, pipe 3, and pump 4 are housed in container 5. Therefore, the battery in the first embodiment may only be assembled in a factory or the like and thereafter conveyed to the installation site so as to install the battery at the site. Namely, the battery in the first embodiment can be installed easily.

In the conventional redox flow battery, tanks 2 and cell 1 for example are arranged separately from one another, resulting in a large installation area. In contrast, as to the battery in the first embodiment, cell 1, tanks 2, pipe 3, and pump 4 are housed in container 5, and therefore, the installation area can be substantially identical to the size of container 5. Namely, the battery in the first embodiment can be installed in a smaller area. As seen from the above, the battery in the first embodiment is easy to install and its installation area is small.

In the first embodiment, the dead space in the whole space within container 5 can be reduced by arranging, in container 5, a plurality of tanks, e.g., positive electrode tank 2a and negative electrode tank 2b in the widthwise direction of container 5. This arrangement enables further downsizing of container 5. In other words, this arrangement enables a greater capacity of tank 2.

In the first embodiment, maintenance of pipe 3 is facilitated by arranging tank 2 between cell 1 and cooler 6 in the longitudinal direction. Further, in the first embodiment, maintenance of cooler 6 and pump 4 is facilitated by arranging cooler 6 and pump 4 between cell 1 and tank 2 in the longitudinal direction. Furthermore, in the first embodiment, maintenance of pipe 3 is facilitated by arranging cell 1 between tank 2 and cooler 6 in the longitudinal direction.

In the first embodiment, if lid 54 is separable from bottom 51, maintenance can be done easily at the installation site by hoisting lid 54 with a crane or the like. In this case, guide member 51c can be provided to prevent damage due to contact of lid 54 with cell 1 for example while lid 54 is hoisted.

In the first embodiment, each of cell 1 and pump 4 disposed in container 5 can be accessed from an openable/closable portion located on side 52 of container 5 and corresponding to cell 1 or pump 4. Accordingly, maintenance is facilitated.

Second Embodiment

In the following, a structure of a battery in a second embodiment is described. Differences from the first embodiment are mainly described herein.

Figure 6:
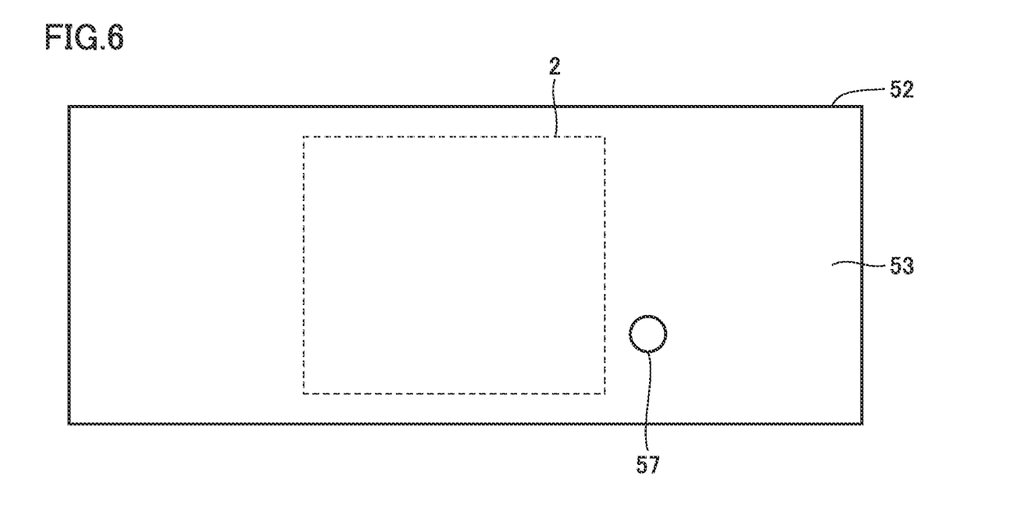
FIG. 6 is a top view of a battery according to a second embodiment.
Figure 7:
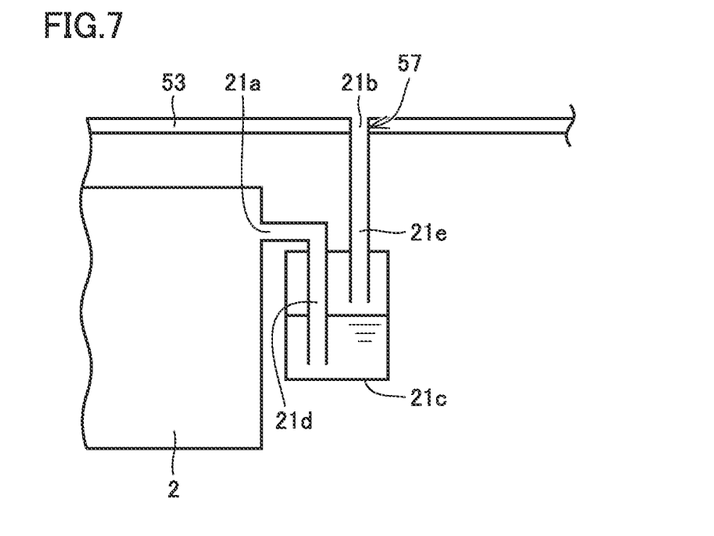
FIG. 7 is a cross-sectional view of a peripheral region of a tank of the battery according to the second embodiment.

The battery in the second embodiment includes cell 1, tank 2, pipe 3, pump 4, container 5, and cooler 6, similarly to the battery in the first embodiment. Container 5 for the battery in the second embodiment, however, differs from the battery in the first embodiment in that container 5 has a hole 57. The battery in the second embodiment also differs from the battery in the first embodiment in that the former battery further includes a valve 21.

FIG. 6 is a top view of the battery in the second embodiment. As shown in FIG. 6, container 5 for the battery in the second embodiment has hole 57. Preferably, hole 57 is formed in top 53 of container 5.

FIG. 7 is a cross-sectional view of a peripheral region of tank 2 of the battery in the second embodiment. As shown in FIG. 7, the battery in the second embodiment includes valve 21. Valve 21 is a pressure valve like water seal valve, for example. Valve 21 is configured to allow gas to flow from a valve inlet 21a to a valve outlet 21b and prevent gas from flowing from valve outlet 21b to valve inlet 21a. Valve 21 thus has valve inlet 21a and valve outlet 21b. Valve inlet 21a communicates with the inside of tank 2. Valve inlet 21a may communicate with the inside of at least one of positive electrode tank 2a and negative electrode tank 2b. Valve outlet 21b communicates with hole 57. Accordingly, valve outlet 21b communicates with the outside of container 5.

Valve 21 includes a valve body 21c, an inlet-side pipe 21d, and an outlet-side pipe 21e. One end of inlet-side pipe 21d forms valve inlet 21a. One end of outlet-side pipe 21e forms valve outlet 21b. Valve body 21c contains a liquid. The liquid in valve body 21c is water, for example. The other end of inlet-side pipe 21d is immersed in the liquid in valve body 21c. The other end of outlet-side pipe 21e is not immersed in the liquid in valve body 21c. Valve 21 is configured in this way to allow gas to flow from valve inlet 21a to valve outlet 21b and prevent gas from flowing from valve outlet 21b to valve inlet 21a.

In the following, an operation of the battery in the second embodiment is described.

In the battery in the second embodiment, electrolyte 13 is stored and gas is also present in tank 2. Increase of the temperature in tank 2 causes the gas in tank 2 to expand. As mentioned above, valve 21 allows gas to flow from valve inlet 21a to valve outlet 21b. Therefore, the gas expanded in tank 2 flows through valve 21 and hole 57 to be discharged to the outside of container 5.

Meanwhile, valve 21 prevents gas from flowing from valve outlet 21b to valve inlet 21a as mentioned above. Therefore, undesired gas is not allowed to flow from the outside of container 5 into tank 2.

In the following, advantageous effects of the battery in the second embodiment are described.

If tank 2 is not equipped with valve 21, increase of the temperature in tank 2 causes increase of the pressure in tank 2. Accordingly, tank 2 may be broken.

In the battery in the second embodiment, tank 2 is equipped with valve 21. Further, valve outlet 21b of valve 21 communicates with hole 57 formed in container 5. Thus, as the temperature in tank 2 increases, the gas in tank 2 is discharged to the outside of container 5. Therefore, even when the temperature in tank 2 increases, increase of the pressure in tank 2 is suppressed. As a result, breakage of tank 2 is suppressed. Moreover, in the battery in the second embodiment, since valve outlet 21b communicates with the outside of container 5, gas in tank 2 can be prevented from filling the inside of container 5.

Third Embodiment

In the following, a structure of a battery in a third embodiment is described. Differences from the first embodiment are mainly described herein.

Figure 8:
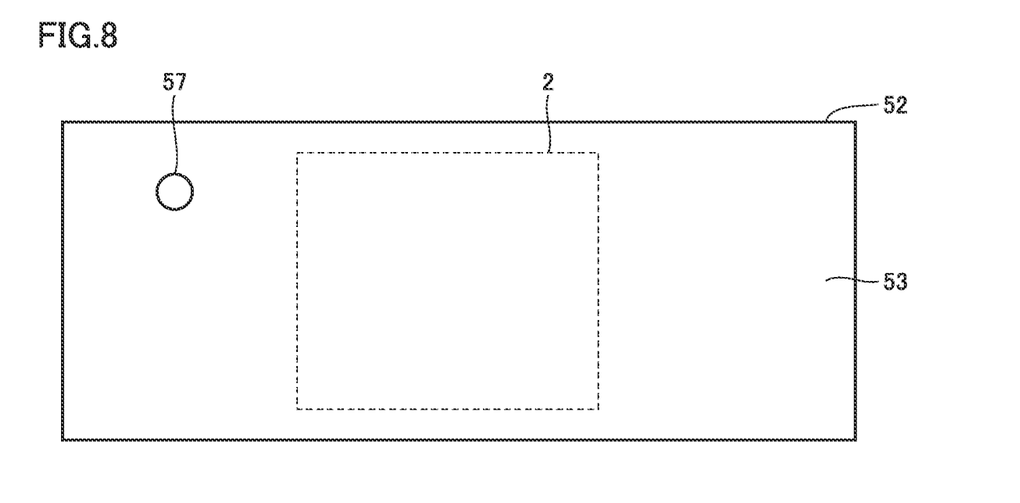
FIG. 8 is a top view of a battery according to a third embodiment.
Figure 9:
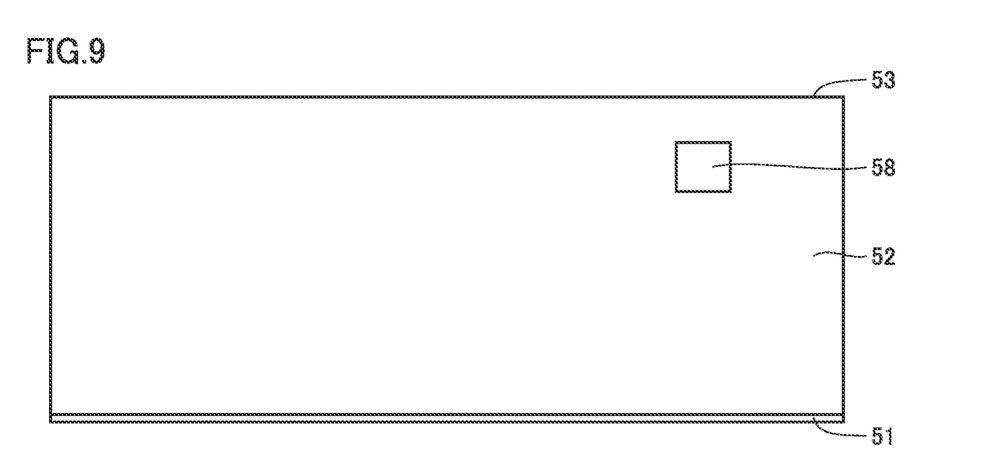
FIG. 9 is a side view of the battery according to the third embodiment.
Figure 10:
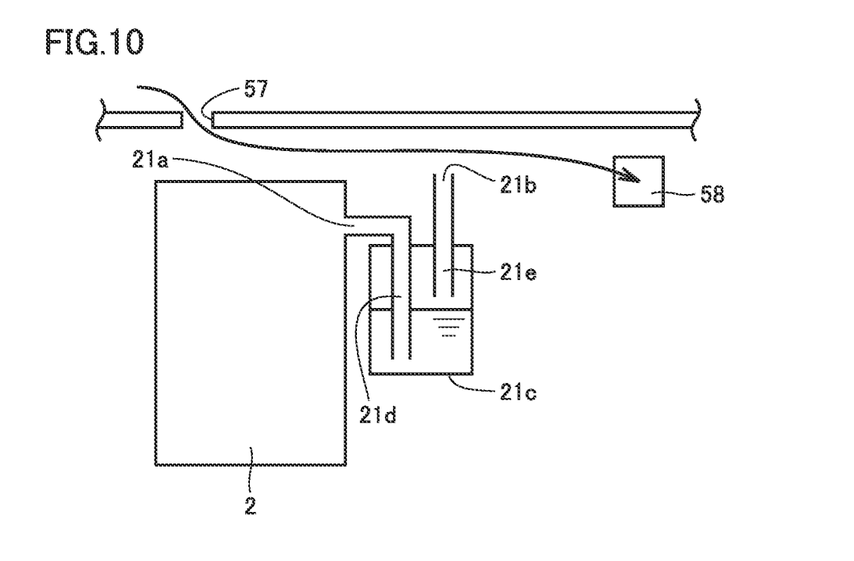
FIG. 10 is a cross-sectional view of a peripheral region of a tank of the battery according to the third embodiment.

The battery in the third embodiment includes cell 1, tank 2, pipe 3, pump 4, container 5, and cooler 6, similarly to the battery in the first embodiment. Container 5 for the battery in the third embodiment, however, differs from the battery in the first embodiment in that container 5 has a hole 57 and a ventilator 58. Further, the battery in the third embodiment differs from the battery in the first embodiment in that the former battery further includes a valve 21. In order to prevent rainwater or the like from entering the inside of container 5, a water cover or the like (not shown) may be disposed appropriately over hole 57.

FIG. 8 is a top view of the battery in the third embodiment. FIG. 9 is a side view of the battery in the third embodiment. As shown in FIGS. 8 and 9, container 5 for the battery in the third embodiment has hole 57 and ventilator 58. Ventilator 58 is a ventilating fan, for example. Preferably, hole 57 is formed in top 53 of container 5. Preferably, ventilator 58 is disposed in side 52 of container 5.

FIG. 10 is a cross-sectional view of a peripheral region of tank 2 of the battery in the first embodiment. As shown in FIG. 10, tank 2 of the battery in the third embodiment includes valve 21. Valve inlet 21a of valve 21 communicates with the inside of at least one of positive electrode tank 2a and negative electrode tank 2b. Valve outlet 21b of valve 21, however, differs from that of the battery in the second embodiment in that valve outlet 21b does not communicate with hole 57. Like the battery in the second embodiment, valve 21 may be any valve allowing gas to flow from valve inlet 21a to valve outlet 21b and preventing gas from flowing from valve outlet 21b to valve inlet 21a. Preferably, valve 21 is a pressure valve like water seal valve.

In the following, an operation of the battery in the third embodiment is described.

In the battery in the third embodiment, electrolyte 13 is stored and gas is also present in tank 2. Increase of the temperature in tank 2 causes the gas in tank 2 to expand. As mentioned above, valve 21 allows gas to flow from valve inlet 21a to valve outlet 21b. Therefore, the gas expanded in tank 2 flows through valve 21 to be discharged to the outside of container 5.

In the battery in the third embodiment, container 5 has hole 57 and ventilator 58. Therefore, in container 5, an airflow from hole 57 to the outside of container 5 through ventilator 58 is generated. As a result, the gas discharged from the inside of tank 2 to the inside of container 5 through valve 21 is conveyed to the outside of container 5.

In the following, advantageous effects of the battery in the third embodiment are described.

If tank 2 does not have valve 21, increase of the temperature in tank 2 causes increase of the pressure in tank 2. Accordingly, tank 2 may be broken.

In the battery in the third embodiment, tank 2 has valve 21. Further, container 5 has hole 57 and ventilator 58. Accordingly, as the temperature in tank 2 increases, gas in tank 2 is discharged to the inside of container 5, and the gas discharged to the inside of container 5 is discharged to the outside of container 5 through ventilator 58. Therefore, even when the temperature in tank 2 increases, increase of the pressure in tank 2 is suppressed. As a result, breakage of tank 2 is prevented and the gas discharged from tank 2 is prevented from filling the inside of container 5.

Fourth Embodiment

In the following, a structure of a battery in a fourth embodiment is described. Differences from the first embodiment are mainly described herein.

Figure 11:
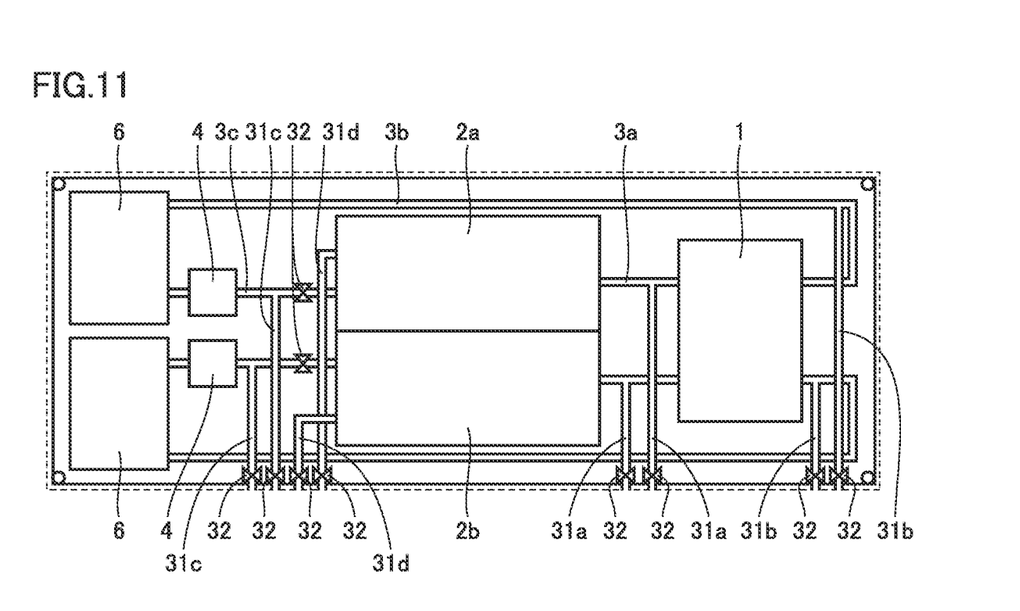
FIG. 11 is a top view of an internal structure of a battery according to a fourth embodiment.

The battery in the fourth embodiment includes cell 1, tank 2, pipe 3, pump 4, container 5, and cooler 6, similarly to the battery in the first embodiment. The battery in the fourth embodiment, however, differs from the battery in the first embodiment in that the former battery includes an additional pipe 31. Additional pipe 31 allows electrolyte 13 for the battery in the fourth embodiment to be supplied to an additional cell 14 and/or an additional tank 22 disposed outside the battery in the fourth embodiment.

FIG. 11 is a top view of an internal structure of the battery in the fourth embodiment. As shown in FIG. 11, additional pipe 31 includes, for example, a first additional pipe 31a, a second additional pipe 31b, a third additional pipe 31c, and a fourth additional pipe 31d.

First additional pipe 31a branches from first pipe 3a toward the outside of container 5. Specifically, one end of first additional pipe 31a is connected to first pipe 3a, and the other end of first additional pipe 31a is connected to side 52 of container 5.

Second additional pipe 31b branches from second pipe 3b toward the outside of container 5. Specifically, one end of second additional pipe 31b is connected to second pipe 3b, and the other end of second additional pipe 31b is connected to side 52 of container 5.

Third additional pipe 31c branches from third pipe 3c toward the outside of container 5. Specifically, one end of third additional pipe 31c is connected to third pipe 3c, and the other end of third additional pipe 31c is connected to side 52 of container 5.

Fourth additional pipe 31d extends from tank 2 toward the outside of container 5. Specifically, one end of fourth additional pipe 31d is connected to tank 2. The other end of fourth additional pipe 31d is connected to side 52 of container 5.

First additional pipe 31a and second additional pipe 31b form a pipe for additional cell. Third additional pipe 31c and fourth additional pipe 31d form a pipe for additional tank. The above-described configuration is an example of additional pipe 31, and additional pipe 31 is not limited to them.

The battery in the fourth embodiment includes a valve 32. Valve 32 is disposed at each of the other end of first additional pipe 31a, second additional pipe 31b, third additional pipe 31c, and fourth additional pipe 31d. Valve 32 is also disposed between tank 2 and a joint of third pipe 3c and third additional pipe 31c. The battery in the fourth embodiment may have an element (not shown) like a check valve defining a flow path appropriately, at each of a preceding location and a following location of the joint where pipe 3 is connected to additional pipe 31.

In the following, an operation of the battery in the fourth embodiment is described.

First, a description is given of a case where the battery in the fourth embodiment is used solely. In this case, all valves 32 are closed. Therefore, in this case, the battery in the fourth embodiment operates similarly to the battery in the first embodiment.

Next, a description is given of a case where a cell is provided in addition to cell 1 of the battery in the fourth embodiment. In this case, respective valves 32 disposed on first additional pipe 31a and second additional pipe 31b are opened. Meanwhile, respective valves 32 disposed on third additional pipe 31c and fourth additional pipe 31d are closed.

Figure 12:
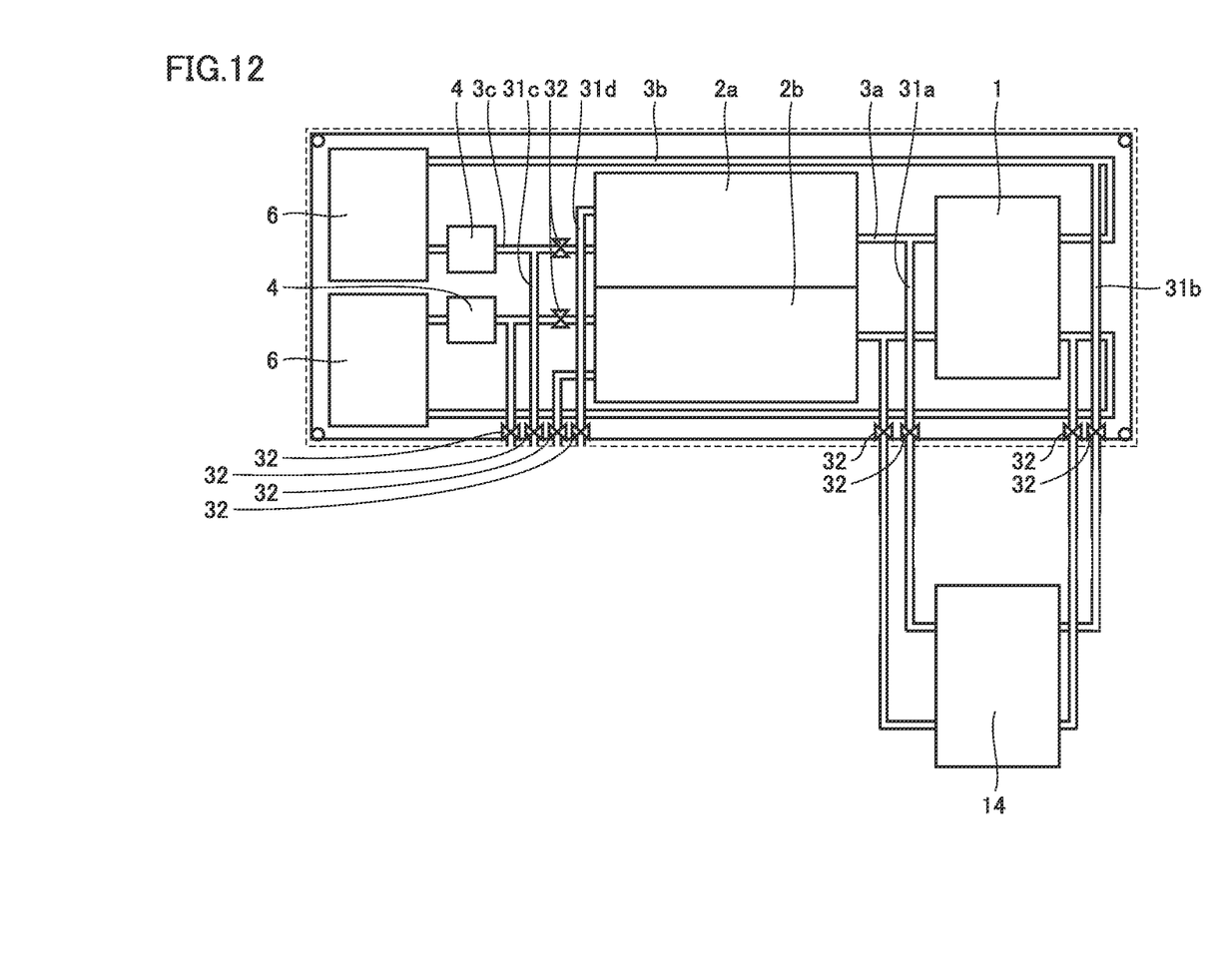
FIG. 12 is a top view showing a state of connection of pipes for adding a cell to the battery according to the fourth embodiment.

FIG. 12 is a top view showing a state of connection of pipes 3 for additionally providing a cell 14 for the battery in the fourth embodiment. As shown in FIG. 12, in the battery in the fourth embodiment, respective other ends of first additional pipe 31a and second additional pipe 31b are connected to additional cell 14.

When connection is made in this way, electrolyte 13 in tank 2 of the battery in the fourth embodiment is supplied to both cell 1 and additional cell 14 of the battery in the fourth embodiment.

Next, a description is given of a case where a tank is provided in addition to tank 2 of the battery in the fourth embodiment. In this case, respective valves 32 disposed on first additional pipe 31a and second additional pipe 31b are closed. Meanwhile, valve 32 disposed between tank 2 and a joint of third pipe 3c and third additional pipe 31c may be closed to circulate electrolyte 13 serially between tank 2 and additional tank 22 (see FIG. 13). Respective valves 32 disposed on third additional pipe 31c and fourth additional pipe 31d are opened.

Figure 13:
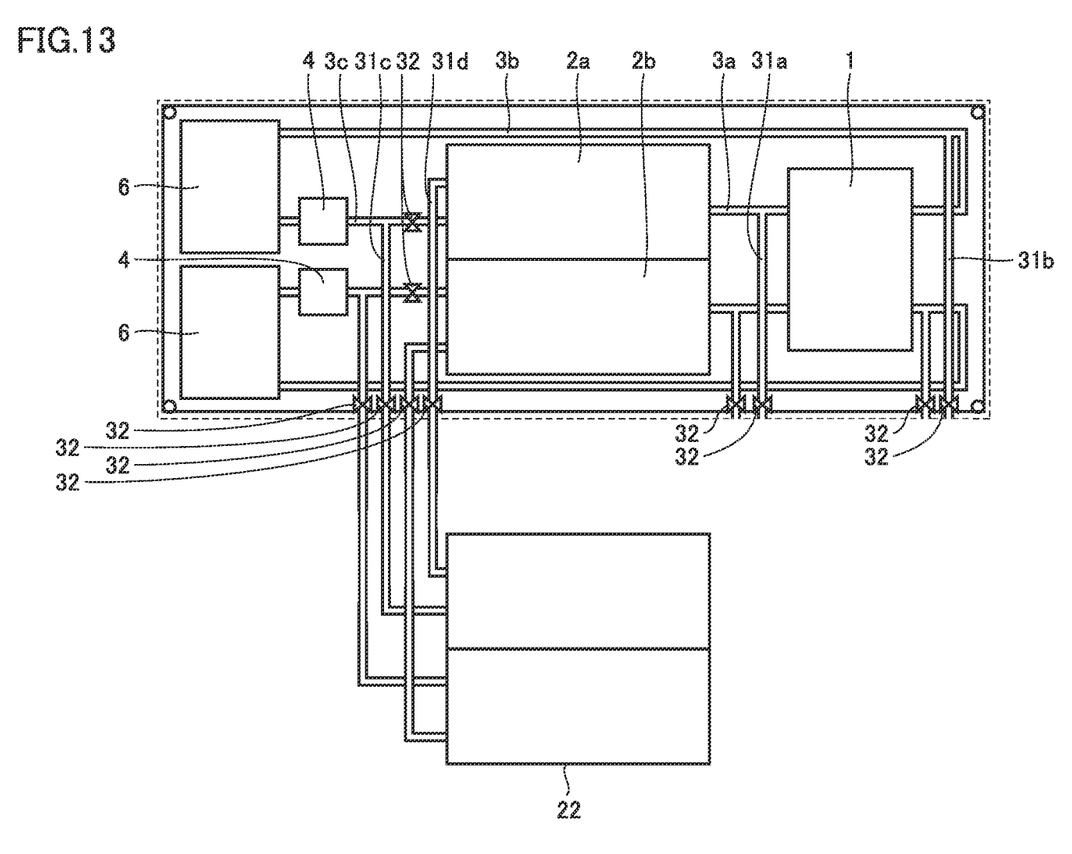
FIG. 13 is a top view showing a state of connection of pipes for adding a tank to the battery according to the fourth embodiment.

FIG. 13 is a top view showing a state of connection of pipe 3 in a case where a tank is provided in addition to tank 2 in the battery in the fourth embodiment. As shown in FIG. 13, in the battery in the fourth embodiment, respective other ends of third additional pipe 31c and fourth additional pipe 31d are connected to additional tank 22.

When the connection is made in this way, both electrolyte 13 in tank 2 and electrolyte 13 in additional tank 22 of the battery in the fourth embodiment are supplied to cell 1.

The above-described configuration of the pipes and valves and the way to connect them are given by way of example. The configuration of the pipes and valves and the way to connect them may be those that enable additional cell 1 and/or additional tank 2 to be provided.

In the following, advantageous effects of the fourth embodiment are described.

The battery in the fourth embodiment includes additional pipe 31. Thus, electrolyte 13 of the battery in the fourth embodiment is supplied to additional cell 14 and/or additional tank 22. Accordingly, regarding the battery in the fourth embodiment, the electric power available from the battery and/or the power capacity of the battery can be increased.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 cell; 11 electrode; 11a positive electrode; 11b negative electrode; 12 membrane; 13 electrolyte; 13a positive electrode electrolyte; 13b negative electrode electrolyte; 14 additional cell; 2 tank; 2a positive electrode tank; 2b negative electrode tank; 21 valve; 21a valve inlet; 21b valve outlet; 21c valve body; 21d inlet-side pipe; 21e outlet-side pipe; 22 additional tank; 3 pipe; 3a first pipe; 3b second pipe; 3c third pipe; 31 additional pipe; 31a first additional pipe; 31b second additional pipe; 31c third additional pipe; 31d fourth additional pipe; 32 valve; 4 pump; 5 container; 51 bottom; 51a longer side; 51b shorter side; 51c guide member; 52 side; 53 top; 54 lid; 55 lifting ring; 56 door; 57 hole; 58 ventilator; 6 cooler; 7 AC-DC converter; 8 control panel; C transformation station; L load; P power generation station

The invention claimed is:

1. A battery comprising:
a plurality of tanks storing electrolyte containing ions of which valence is changed;
a cell configured to cause oxidation-reduction of the electrolyte so as to be charged or discharged;
a pipe connecting the plurality of tanks and the cell;
a pump configured to circulate the electrolyte between the plurality of tanks and the cell through the pipe;
a container having a bottom, a side, and a top and housing the plurality of tanks, the cell, the pipe, and the pump; and
an additional tank disposed outside the container and fluidly connected to the plurality of tanks in the container, wherein
the container has a widthwise direction and a longitudinal direction,
the bottom has a first side parallel to the longitudinal direction and a second side parallel to the widthwise direction,
the second side is shorter than the first side,
the plurality of tanks are arranged in the widthwise direction,
the container has a hole allowing the inside and an outside of the container to communicate with each other, and
the battery comprises a ventilator configured to generate an airflow from the inside of the container toward the outside of the container through the hole.

2. The battery according to claim 1, comprising a cooler configured to cool the electrolyte, wherein
the plurality of tanks are arranged between the cooler and the cell in the longitudinal direction.

3. The battery according to claim 1, comprising a cooler configured to cool the electrolyte, wherein
the cooler is disposed between the plurality of tanks and the cell in the longitudinal direction.

4. The battery according to claim 1, comprising a cooler configured to cool the electrolyte, wherein
the cell is disposed between the plurality of tanks and the cooler in the longitudinal direction.

5. The battery according to claim 1, comprising a valve including a valve inlet and a valve outlet and configured to prevent gas from flowing from the valve outlet to the valve inlet, wherein
the valve inlet communicates with an inside of at least one of the plurality of tanks.

6. The battery according to claim 5, wherein
the valve outlet communicates with an outside of the container.

7. A battery comprising:
a plurality of tanks storing electrolyte containing ions of which valence is changed;
a cell configured to cause oxidation-reduction of the electrolyte so as to be charged or discharged;
a pipe connecting the plurality of tanks and the cell, the pipe having a first portion and a second portion;
a pump configured to circulate the electrolyte between the plurality of tanks and the cell through the pipe, the electrolyte being supplied from one of the plurality of tanks to the cell through the first portion and returning from the cell to the one of the plurality of tanks through the second portion;
a container having a bottom, a side, and a top and housing the plurality of tanks, the cell, the pipe, and the pump; and
an additional pipe, the additional pipe having a third portion and a fourth portion,
wherein the third portion is branched from the second portion and connectable to an additional tank disposed outside the container to allow the electrolyte to be supplied to the additional tank,
wherein the fourth portion is connected to the one of the plurality of tanks and connectable to the additional tank to allow the electrolyte to return from the additional tank to the plurality of tanks.

8. A battery comprising:
a plurality of tanks storing electrolyte containing ions of which valence is changed;
a cell configured to cause oxidation-reduction of the electrolyte so as to be charged or discharged;
a pipe connecting the plurality of tanks and the cell, the pipe having a first portion and a second portion;
a pump configured to circulate the electrolyte between the plurality of tanks and the cell through the pipe, the electrolyte being supplied from one of the plurality of tanks to the cell through the first portion and returning from the cell to the one of the plurality of tanks through the second portion;

a container having a bottom, a side, and a top and housing the plurality of tanks, the cell, the pipe, and the pump; and an additional pipe, the additional pipe having a third portion and a fourth portion, wherein the third portion is branched from the first portion and connectable to an additional cell disposed outside the container and the fourth portion is connected to the second portion and connectable to the additional cell, wherein the third portion and fourth portion allow the electrolyte to flow from the one of the plurality of tanks to the cell and the additional cell in parallel.

9. The battery according to claim 1, wherein the container includes a lid formed by the side and the top, and the lid is separable from the bottom.

10. The battery according to claim 1, wherein the container includes a guide member extending in a direction from the bottom to the top.

11. The battery according to claim 1, wherein the plurality of tanks are spaced from at least one of the side and the top.

12. The battery according to claim 1, wherein at least one of a portion of the container located on the side and corresponding to the cell and a portion of the container located on the side and corresponding to the pump is openable and closable.

\* \* \* \* \*